United States Patent [19]

Miyamoto et al.

[11] 4,035,193

[45] July 12, 1977

[54] METHOD AND APPARATUS FOR CALCINING POWDERED MATERIAL FOR CEMENT

[75] Inventors: Shigeyoshi Miyamoto, Saeki; Kosuke Yamashita, Hiroshima, both of Japan

[73] Assignee: Mitsubishi Jukogyo Kabushiki Kaisha, Tokyo, Japan

[21] Appl. No.: 599,658

[22] Filed: July 28, 1975

[30] Foreign Application Priority Data

July 31, 1974 Japan .............................. 49-87697

[51] Int. Cl.² .......................................... C04B 7/44
[52] U.S. Cl. ............................................... 106/100
[58] Field of Search ..................................... 106/100

[56] References Cited

U.S. PATENT DOCUMENTS 3,873,331  3/1975  Kondo et al. ...................... 106/100

*Primary Examiner*—J. Poer
*Attorney, Agent, or Firm*—Toren, McGeady and Stanger

[57] ABSTRACT

A method and apparatus for calcining powdered material for cement manufacture by making good use of the sensible heat and fluidity of preheated material in the burning process and utilizing the material as a catalyst for diffusing and vaporizing fuel, thereby producing reducing gases, and then bringing the reducing gases into contact with the combustion gases from a kiln for stepwise combustion so that the cement material is decarbonated and the nitrogen oxide contents of the exhaust gases from the kiln are decreased.

4 Claims, 7 Drawing Figures

METHOD AND APPARATUS FOR CALCINING POWDERED MATERIAL FOR CEMENT

This invention relates to a method and apparatus for calcining powdered material for cement manufacture by effectively utilizing the sensible heat and fluidity of the material in diffusing and vaporizing fuel for stepwise combustion so that the endothermic reaction of the cement material is promoted and highly efficient and stabilized operation is ensured.

Various methods and contrivances have hitherto been proposed for increasing the burning capacity per unit volume of a conventional kiln equipped with a suspension preheater by installing a calciner between the kiln and preheater. However, all of them have difficulties yet to be overcome as will be described below.

For example, in withdrawing hot air from a clinker cooler and using the same for the combustion purpose in accordance with the prior art methods, the air is directly admitted to the gas producer. This usually brings frequent temperature variations, which in turn have an adverse effect upon the operation of the suspension preheater, even leading to clogging of the cyclones constituting the preheater.

In introducing the extracted air into the calciner, the methods require a throttling mechanism or forced draft fan or both, in either case with much power consumption. The throttling mechanism for facilitating the introduction of the extracted air is mounted on the downstream side of the point where the exhaust gases from the kiln join those from the calciner. Therefore, chlorine and alkalis tend to deposit on the brick lining wall portion of the suspension preheater beneath the throttling mechanism. The deposit or coating grows with the operation until eventually it reduces the temperature of the extracted air from the clinker cooler.

Further, when the system is designed to supply fuel, primary air, secondary air (extracted from the cooler) and material altogether to the calciner, localized overheating can take place. To avoid this overheating, another design maintains short oxygen supply to the calciner. This tends to cause so-called after burning in the cyclones of the suspension preheater connected to the calciner. The after burning can result in clogging of the cyclones.

While the cyclones must be constantly supplied with air in an amount not less than a predetermined level, it is not easy for some time immediately after the start when the load is light to extract a sufficient volume of exhaust gases from the kiln for the material being fed to the cyclones. Thus, the maintenance of constantly stabilized material supply is required. The construction of some other design is such that the material supply is short-circuited when the system is operating at high load.

It is an object of the present invention to provide a method for calcining cement material without the disadvantages of the conventional methods, and an apparatus therefor. According to the invention, in the calcination of cement material, fuel is incompletely burned with primary combustion air to produce reducing gases, the cement material is partially calcined with the resulting gases, the reducing gases including the material are mixed with exhaust gases from the burning process which contain much nitrogen oxides so that the exhaust gases are denitrated. Then, secondary air is added to burn completely the incompletely burned portion of the gas mixture so as to nearly conclude the calcination of the cement material.

Another object of the invention is to provide a calcining method and apparatus in which the above-mentioned process of producing reducing gases through incomplete combustion of fuel consists of mixing the cement material with primary air in the form of a swirling stream, mixing fuel into the swirling mixture to gasify the fuel while effecting almost uniform partial combustion, partially calcining the cement material, and promoting the diffusion and vaporization of the fuel by dint of the fluidity of the cement material, whereby the production of the reducing gases is accomplished within a short period of time.

Still another object of the invention is to provide a calcining method and apparatus in which the temperature in the above-mentioned process for producing reducing gases through incomplete combustion of fuel is maintained at below the calcining temperature of the cement material so as to avoid melting of the material.

A further object of the invention is to provide a calcining method and apparatus in which the above-mentioned secondary air is the air once used as a cooling medium for the cement clinker so that the terminal energy of the used air is effectively utilized and further the production of reducing gases with the thermal decomposition of fuel is promoted.

These and other objects and advantages of the present invention will become more apparent from the following description taken in conjunction with the accompanying drawings showing two embodiments of the invention. In the drawings.

Figure 1:
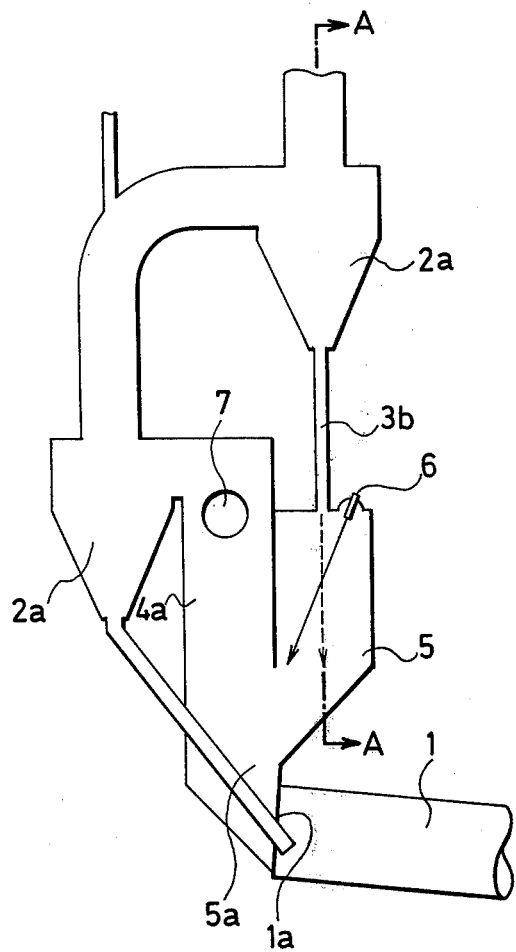
FIG. 1 is a schematic view of a calcining apparatus embodying the invention.
Figure 2:
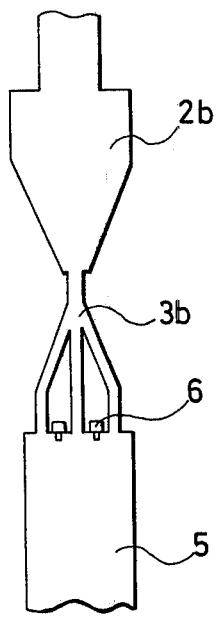
FIG. 2 is a detail of FIG. 1.
Figure 3:
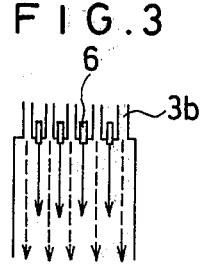
FIG. 3 is a fragmentary view of burners and material chutes located alternately.

Referring to the drawings, specifically to FIGS. 1 and 2, there is shown a gas producer 5, the bottom 5a of which is integrally connected to the inlet end 1a of a rotary kiln 1. Above the bottom 5a is formed a gas duct 4a of the lowermost cyclone 2a of a suspension preheater. A secondary-air supply port 7 is open in the duct 4a. A plurality of burners 6 are mounted on the gas producer to inject fuel and primary air into the producer, toward the bottom 5a. Fuel may be either a combustible gas itself or one that generates combustible gas on heating. On top of the gas producer 5 are open a plurality of material chutes 3b in communication with another cyclone 2b. The burners 6 are adapted to burn the material supplied from the material chutes 3a toward the bottom 5a with insufficient oxygen. The burners 6 and material chutes 3b are located in a relationship such that the line extended from each burner 6, indicated by a full-line arrow in FIG. 1, intersects midway with the line extended from each material chute 3b, indicated by a broken-line arrow, within the gas producer 5. Also, as shown in FIG. 3, the burners and material chutes are alternately arranged. In this relationship the burners and material chutes produce parallel streams of a mixture of fuel and primary air alternately with parallel streams of material (as in FIG. 3) to facilitate the vaporization and combustion of the fuel and the endothermic reaction of the material.

Under the invention, the material preheated to 600° – 700° C in the cyclone 2b is supplied dividedly through the plurality of material chutes 3b into the gas producer 5, where it is mixed with the fuel and primary air supplied through the burners 6 and burned with insufficient oxygen. As a result, reducing gases at a relatively low temperature of about 750° – 800° C are produced. The resulting gases join the hot exhaust gases from the kiln forming an oxidizing flame, and the mixture burns at a faster rate. The gas mixture burns completely with secondary air supplied through the supply port 7 that opens in the space above the bottom 5a. At the same time, the catalytic action of CaO, $Fe_2O_2$, etc. in the cement material contributes to the reduction of NOx contents of the exhaust gases from the kiln.

Generally speaking, a kiln 1 equipped with a calciner (which is referred to as a gas producer 5 in this specification) burns and forms two to three times as much cement clinker per unit space as that produced by an ordinary kiln accompanied by a suspension preheater. Consequently, the wear and damage of fittings at the outlet end of the kiln 1 and of the cooler are intensified by the radiant heat and abrasive effect of the clinker. To avoid such wear and damage, for one thing, it is desirable for operation to increase the excess air ratio of the secondary air being supplied from the kiln 1 and lower the air temperature. In accordance with the present invention, the excess air ratio of the exhaust gases from the kiln is kept within about 1.1 – 1.2 for usual operation so that the NOx contents of the exhaust emissions can be materially reduced.

Figure 4:
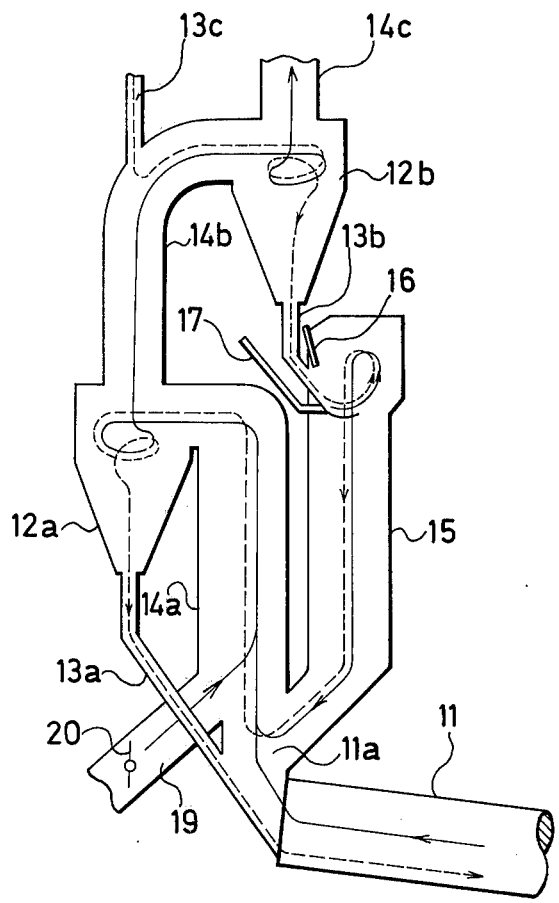
FIG. 4 is a schematic view of another embodiment of the invention.

Another embodiment of the invention will now be explained in detail with reference to FIGS. 4 to 7. FIG. 4 shows an ordinary kiln equipped with a suspension preheater and incorporating an apparatus embodying the invention. In the Figure broken lines indicate the flow directions of powdered cement material, and full lines indicate the flow directions of gases and air for combustion.

In operation, the cement material to be fed to a gas producer 15 is preheated to 600° – 700° C in the upper cyclones of the suspension preheater and is supplied through a material chute 13b. Fuel is injected through fuel injection pipes 16 at such an angle as to diffuse the material inside the gas producer 15. The injected fuel sticks to the material particles and is dispersed by the fluidity of the material, and then begins to decompose, when it contacts the air blown in through a primary air pipe 17 and burns partly. The rest of fuel is diffused and vaporized by the sensible heat of the material and by the heat of partial combustion.

Figure 5:
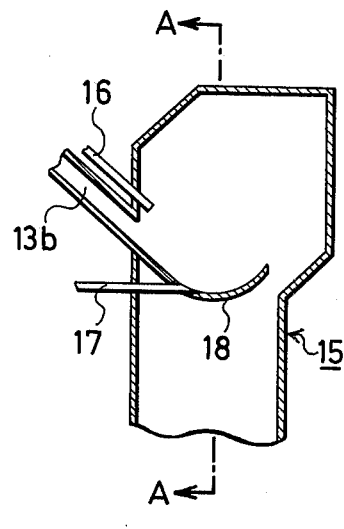
FIG. 5 is a detail of the material feeding section of a gas producer.
Figure 6:
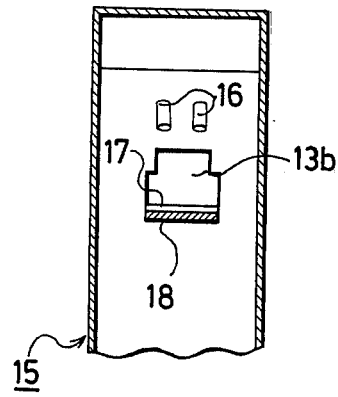
FIG. 6 is a sectional view taken along the line A—A of FIG. 5.
Figure 7:
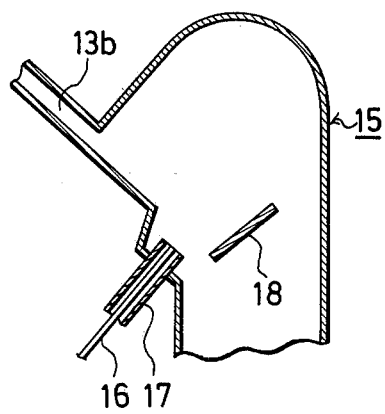
FIG. 7 shows a modified form of the material feeding section.

A guide plate 18 is installed with the view to extending the time of contact between the material and fuel or to effecting their diffusion and mixing efficiently. It may be curved as shown in FIG. 5, or plate-like as in FIG. 7, or may take any other desired shape provided that it is located at a sufficient angle to the axis of the material chute 13b to reverse the direction of material flow within the chute. It must also be properly located relative to the fuel injection pipes 16 and the primary air pipe 17 so that the streams from the pipes can assist in the reversal of flow direction.

The material and vaporized fuel flow together downwardly through the gas producer 15 and join exhaust gases from the kiln at a junction 11a, and move altogether upwardly through a gas duct 14a. Secondary air is introduced from a secondary air duct 19 via a damper 20 to the lower part of the gas duct 14a.

The material that has completed heat absorption is separated from the gases in a cyclone 12a in the lowermost stage of the suspension preheater and is conducted to the kiln 11 through a material chute 13a.

On the other hand, the separated exhaust ascends through the gas duct 14b into an upper cyclone 12b, where it exchanges heat with the material fed in through a material chute 13c, and is led to a gas duct 14c.

The functions and advantages of the invention will now be more fully described.

In the present invention, the sensible heat and fluidity of the powdered material are fully utilized, and a swirling stream is formed in the upper space of the gas producer 15 to prolong the time of contact between the material and fuel and carry out their thorough diffusion and mixing. In this manner adequate fuel vaporization is achieved with insufficient oxygen supply or with less than a half of the amount of air theoretically required for the combustion.

When the amount of primary air is insufficient, the partly vaporized fuel may stick to the material particles and fall together at the inlet end of the kiln 11. Even if this occurs, the vaporization of fuel will be most easily accomplished by the contact of the dropping with the hot exhaust gases from the kiln. Thus, there is a good possibility of saving the primary air supply. In addition, the temperature inside the gas producer 15 can be kept at a relatively low level, and there is no danger of material deposition and sintering on he inner wall surfaces.

The gases produced join the exhaust gases from the kiln usually with an excess air ratio of 1.05 – 1.2. The mixture continues to burn, and complete combustion is accomplished with the addition of hot air extracted from the clinker cooler via the secondary air duct 19.

The combustion thus carried out in the three different stages precludes localized overheating, permitting the temperature control throughout the system within the range of 700° – 900° C or a temperature range that minimizes the formation of nitrogen oxides. The nitrogen oxides already formed in the kiln are reduced to nitrogen by the catalytic action of the calcium oxide, ferric oxide, etc. contained in the cement material. The catalytic action is exerted only when the gases produced by the gas producer 5 with a short oxygen supply are mixed with the exhaust gases from the kiln that contain excess oxygen and the gas mixture is further combined with the air extracted from the clinker cooler.

According to the present invention, the air withdrawn from the clinker cooler is not directly admitted to the gas producer, and therefore the draft resistance of the extraction system is low enough for the damper 20 installed in the duct to control the air supply to meet the temperature variation of the air extracted from the cooler. In this way stable operation of the apparatus is ensured. Moreover, because the gases produced are introduced into the part immediately above the junction between the suspension preheater and the kiln 11, the temperature in the lowermost stage of the preheater is low (approximately 900° C) and the deposition of chlorine and alkalis on the brick lining surfaces which would otherwise obstruct the air passage is avoided.

Further, the construction in accordance with the present invention prevents short-circuiting of the material even during heavy load operation, and permits the flow velocity of the exhaust gases from the kiln to be easily increased when the load is light for some time after the start. Consequently, there is no danger of clogging of the cyclones due to instable supply of the material.

What is claimed is:

1. A method for calcining powdered cement material comprising the steps of: suspending the material in primary air; blowing into the suspension fuel in an amount in excess of that which is sufficient for complete combustion with the oxygen contained in the suspension to effect partial calcination of the material and incomplete combustion of the fuel, thereby to obtain reducing exhaust gases including the partially calcined material and a remainder of combustible gases; producing from a process of burning cement material exhaust gases which contain relatively large amounts of nitrogen oxides; mixing said reducing exhaust gases including said partially calcined material and said exhaust gases from said cement burning process to produce a mixture stream thereof; adding to said mixture stream an amount of secondary air sufficient for complete combustion of said remainder of combustible gases contained in said mixture stream thereby concluding the combustion of said remainder of combustible gases and calcining the individual material particles; and thereafter separating the calcined powdery material from the product of said calcining and concluded combustion.

2. A method according to claim 1 wherein the cement material and primary air are mixed in the form of a swirling stream and fuel is added thereto.

3. A method according to claim 1 wherein, in the process of producing reducing exhaust gases, the temperature therefor is kept below the calcining temperature of the cement material so as to avoid melting of the cement material.

4. A method according to claim 1 wherein the secondary air is the air used as a cooling medium in the clinker cooler.

* * * * *